(12) United States Patent
Chupick (10) Patent No.: US 6,390,460 B2
(45) Date of Patent: May 21, 2002

(54) FREE-FLOATING HYDRAULIC CLAMPING DEVICE WITH EDGE-GRIPPING ARBOR

(76) Inventor: Charles Chupick, 4934 Rivers Edge, Troy, MI (US) 48098

( * ) Notice: Subject to any disclaimer, the term of this patent is extended or adjusted under 35 U.S.C. 154(b) by 0 days.

(21) Appl. No.: 09/851,061

(22) Filed: May 8, 2001

Related U.S. Application Data (63) Continuation-in-part of application No. 09/426,597, filed on Oct. 26, 1999, now Pat. No. 6,241,228.

(51) Int. Cl.⁷ .................................................. B23Q 3/14
(52) U.S. Cl. ...................... 269/48.1; 269/48.3; 29/252; 29/263
(58) Field of Search ............................... 269/48.1, 48.3, 269/71, 309, 311; 29/263, 252

(56) References Cited

U.S. PATENT DOCUMENTS

| | | | | |
|---|---|---|---|---|
| 2,950,525 A | * | 8/1960 | Duncan et al. ............... 29/252 |
| 3,000,086 A | * | 9/1961 | Davis ........................ 269/48.1 |
| 3,289,525 A | * | 12/1966 | Lee ........................... 269/48.3 |
| 3,568,562 A | * | 3/1971 | Harwood ..................... 269/48.3 |
| 3,654,685 A | * | 4/1972 | Shiflet .......................... 29/252 |
| 3,770,287 A | * | 11/1973 | Weber et al. ............... 269/48.1 |
| 3,791,011 A | * | 2/1974 | Keys ............................ 29/252 |
| 3,947,950 A | * | 4/1976 | Adams .................. 29/243.518 |
| 4,000,556 A | * | 1/1977 | Ciminero ..................... 29/252 |
| 4,208,061 A | * | 6/1980 | Morawski .................. 269/48.1 |
| 4,369,569 A | * | 1/1983 | Armstrong, Jr. et al. ...... 29/252 |
| 5,103,548 A | * | 4/1992 | Reid et al. .................... 29/263 |
| 5,224,690 A | * | 7/1993 | Vaught ....................... 269/48.3 |

* cited by examiner

Primary Examiner—Joseph J. Hail, III
Assistant Examiner—Hadi Shakeri
(74) Attorney, Agent, or Firm—Harness, Dickey & Pierce, P.L.C.

(57) ABSTRACT

The present invention provides a workholder and a method for securing a work piece by engaging either a bore contained in the work piece or by gripping the edge of the bore of the work piece. The workholder includes a support platform, and a bore clamping device that is mounted to the support platform. The clamping device has a cylindrical, expandable arbor extending upwardly from the support platform for positioning in and engaging the bore or for gripping an outer edge of the bore.

19 Claims, 10 Drawing Sheets

FREE-FLOATING HYDRAULIC CLAMPING DEVICE WITH EDGE-GRIPPING ARBOR

CROSS-REFERENCE TO RELATED APPLICATIONS

This application is a continuation-in-part of U.S. patent application Ser. No. 09/426,597, filed on Oct. 26, 1999 now U.S. Pat. No. 6,241,228. The disclosure of the above application is incorporated herein by reference.

BACKGROUND AND SUMMARY OF THE INVENTION

In conventional manufacturing, work pieces typically are secured to a surface or fixture to allow cutting elements, such as mills, to accurately remove material from the work piece and shape the work piece into a final product. Various support platforms, such as work benches, are suitable to serve as the support platform. The support platform serves to provide a solid base against which the cutting element may apply pressure to the work piece and also provides a foundation for dimensional consistency. To secure the work piece to the support platform, clamping devices are employed which extend from the support platform, around a side of the work piece and apply pressure to an upper surface of the work piece opposite the support platform. As a result, the clamp presses the work piece against the support platform to allow the cutting elements to proceed in machining areas of the work piece which are not obstructed by the clamping element.

While this clamping method effectively secures the work piece to the support platform, the positioning of the clamps often obstructs the cutting elements access to the work piece and thereby renders machining difficult. As a result, the work piece must be continuously unclamped and reclamped in different areas to allow access to the previously obstructed areas. This causes increased manufacturing cost and time. The present invention was developed to overcome these concerns.

It is, therefore, an object of the present invention to provide a workholder which utilizes an expandable arbor to engage bores contained within the work piece, thereby maximizing the amount of access the cutting element has to the work piece.

It is yet another object of the present invention to provide a workholder which utilizes an expandable arbor to engage bores contained within the work piece, which first clamps the bores and then draws the work piece against a support platform.

It is still another object of the present invention to provide a workholder which utilizes an expandable arbor to engage bores contained within the work piece, wherein the amount of expansion force generated by the expandable arbor on the bores is variable.

It is still another object of the present invention to provide a workholder which utilizes an expandable arbor to engage bores contained within the work piece, which allows adjustment for varying hole positioning on the work piece.

To accomplish these and other objects, the present invention provides a workholder for securing a work piece by engaging at least one bore contained in the work piece and locating on a second bore of the work piece. The workholder includes a support platform, bore clamping device, and a locator assembly. The bore clamping device is mounted to the support platform and has a cylindrical, expandable arbor extending upwardly from the support platform for position-ing in and engaging the bore. The locator assembly has a locator pin extending upwardly from the support platform for positioning within and locating the second bore.

In another aspect of the present inventor, a workholder for securing a work piece by engaging a plurality of bores contained in the work piece which includes a support platform and a plurality of bore clamping devices mounted to the support platform. Each bore clamping device has a cylindrical, expandable arbor extending upward from the support platform for engaging one of the bores.

Another aspect of the present invention includes an expandable arbor having a cap that spreads out to engage the work piece upper surface prior to a force exerting downward on and clamping the work piece.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
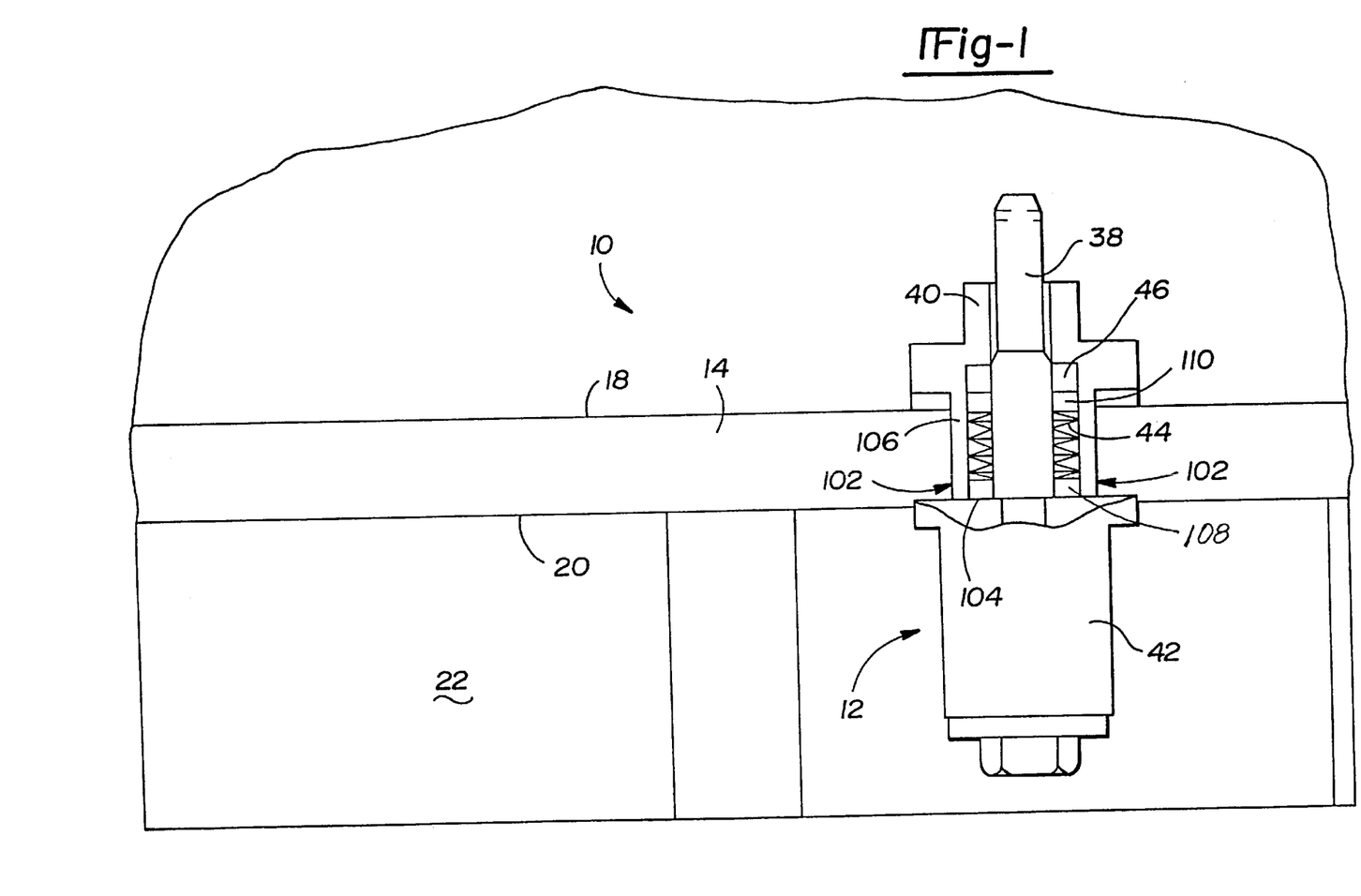
FIG. 1 is a cross-sectional view of a workholder according to the present invention.

Referring now to FIG. 1, a workholder 10 is shown and described. Workholder 10 generally comprises clamping device 12 mounted to support platform 14. Support platform 14 has an upper surface 18 and a lower surface 20 which is adjacent to a lower cavity 22. Upper surface 18 is preferably machined to specific tolerances (for reasons which will be discussed). Clamping device 12 generally includes a cylindrical expandable arbor 38, elevated support 40, hydraulic cylinder 42, spring element 44, and wedge 46.

Figures 2, 3, 4A, 4B:
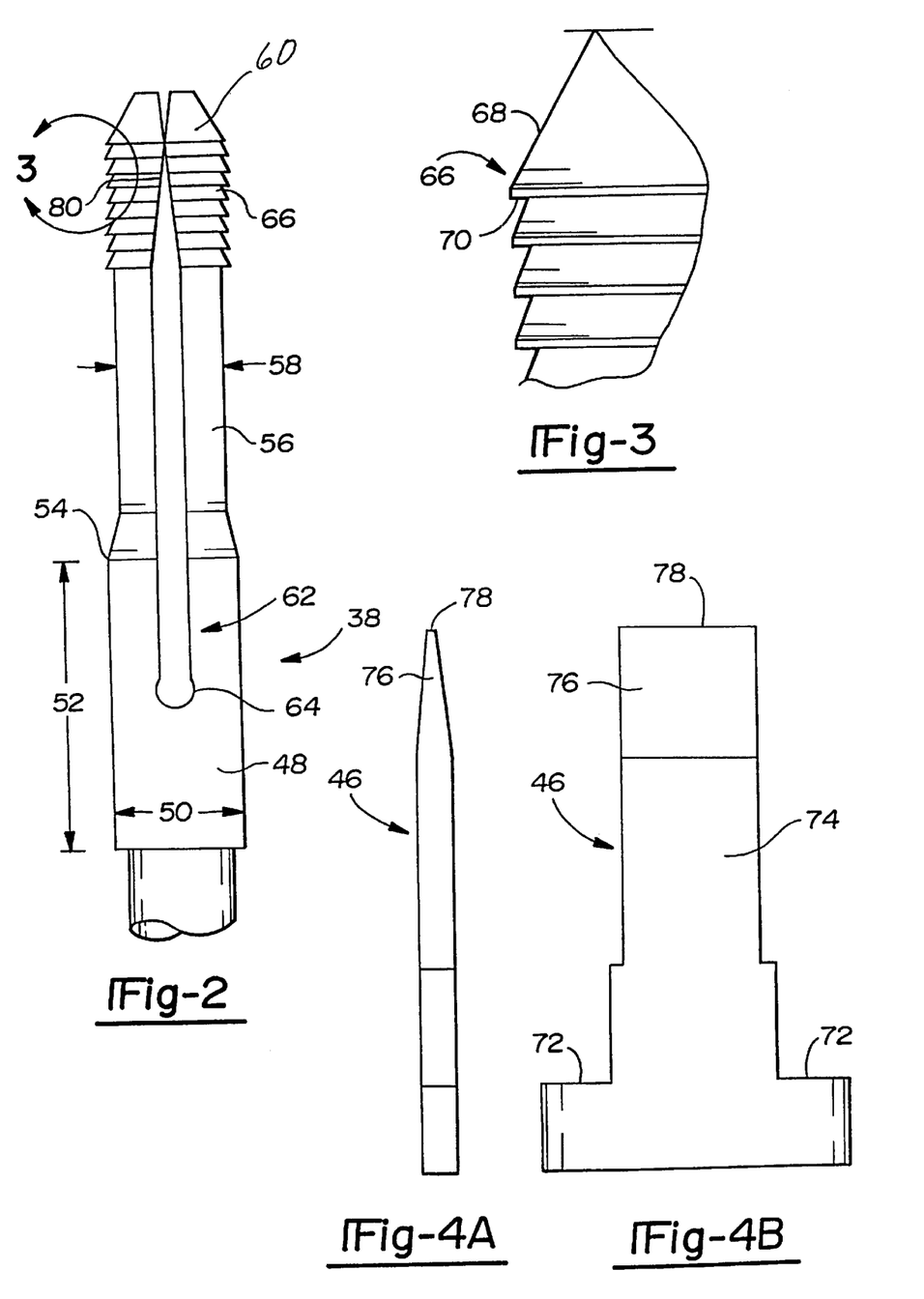
FIG. 2 is a side view of a cylindrical expandable arbor of a workholder according to the present invention.
FIG. 3 is a side view of serrated edges of a workholder according to the present invention.
FIG. 4A is a side view of a wedge of a workholder according to the present invention.
FIG. 4B is a front view of a wedge of a workholder according to the present invention.

Referring now to FIG. 2, cylindrical expandable arbor 38 of clamping device 12 is described in greater detail. Cylindrical expandable arbor 38 has a first portion 48 having an outer diameter 50 extending a predetermined length 52 along first portion 48. At a transition point 54, first portion 48 chamfers inwardly to second portion 56. Second portion 56 has a second diameter 58 which extends upwardly along second portion 56 until reaching tip 60. Slit 62 extends upwardly along cylindrical expandable arbor 38 from a first end 64 and terminates at a point distally located from first portion 48, preferably tip 60. Around the upper area of second portion 56 is located a series of serrated edges 66. As shown in FIG. 3, serrated edges 66 generally have sloped upper area 68 and jagged downward surfaces 70. By this way, serrated edges 66 are able to draw traction force in a downward direction with respect to cylindrical expandable arbor 38. The arbor is preferably made of hardened steel.

Referring now to FIG. 4A and FIG. 4B, wedge 46 is described in greater detail. As is shown, wedge 46 has a pair of wings 72 which extend outwardly from a central body 74. At the upper portion of central body 74, central body 74 chamfers at area 76 toward a point 78.

Figure 5:
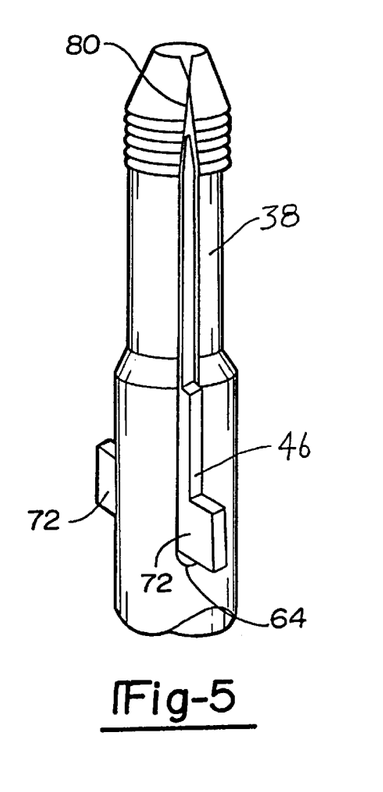
FIG. 5 is a perspective view of a cylindrical expandable arbor of a workholder according to the present invention.

Referring now to FIG. 5, cylindrical expandable arbor 38 is shown assembled with wedge 46. As shown, wings 72 are positioned proximate end 64 and extend outwardly from both sides of cylindrical expandable arbor 38. Central body 74 of wedge 46 extends upwardly inside slit 62 until being proximate narrowed region 80.

Figure 6:
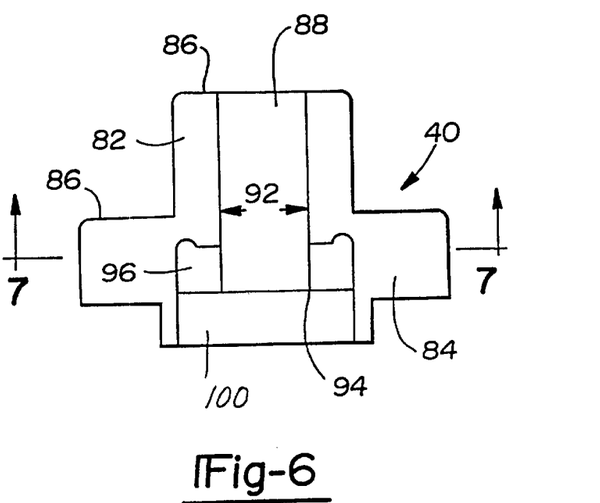
FIG. 6 is a cross-sectional view of an elevated support of a workholder according to the present invention.
Figure 7:
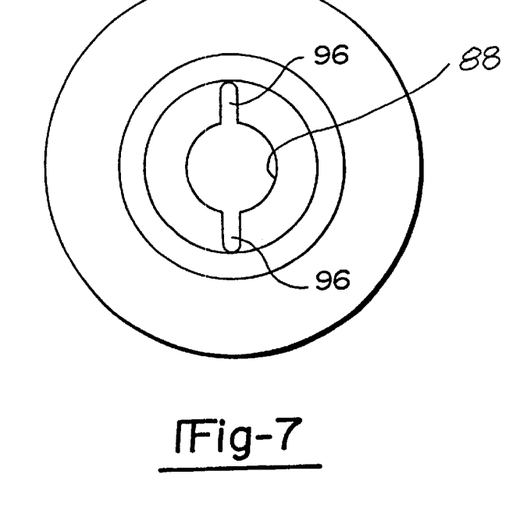
FIG. 7 is a sectional view of an elevated support of a workholder along lines 7—7 in FIG. 6 according to the present invention.

Referring now to FIG. 6, elevated support 40 is described in greater detail. Elevated support 40 has an upper cylindrical region 82 and an outer rim 84. Both upper cylindrical region 82 and outer rim 84 have a pair of locating surfaces 86. Passage 88 extends through elevated support 40 downward to a predetermined depth 94. Inner diameter 92 is substantially equal to outer diameter 50 of cylindrical expandable arbor 38 to provide lateral support of cylindrical expandable arbor 38. Elevated support 40 further has a pair of square slots 96 which are dimensioned to accommodate wings 72. A lower part of elevated support 40 is a counterbore 100. Counterbore 100 has a diameter substantially larger than diameter 92. In FIG. 7, a sectional view of section 7—7 in FIG. 6 is shown. Here, square slots 96 can clearly be seen. Moreover, the extension of passage 88 to predetermined depth 94 is also readily understood.

Referring again to FIG. 1, the assembly of clamping device 12 will now be discussed. Cylindrical expandable arbor 38 passes through passage 88 and is operationally engaged to hydraulic cylinder 42. In its unclamped state, a part of first portion 48 of cylindrical expandable arbor 38 is flush against a portion of inner diameter 92 of elevated support 40. Counterbore 100, outer diameter 102 of support platform 14 and upper face 104 form the bounds of a cavity 106. Within cavity 106 and positioned on spacer 108 is spring element 44. Preferably, spring element 44 is a plurality of stacked belleville washers. Positioned on spring element 44 is spacer 110. Spacer 108 and spacer 110 are dimensioned such that the bottoms of wings 72 are flush against the upper area of spacer 110.

Figures 8A, 8B:
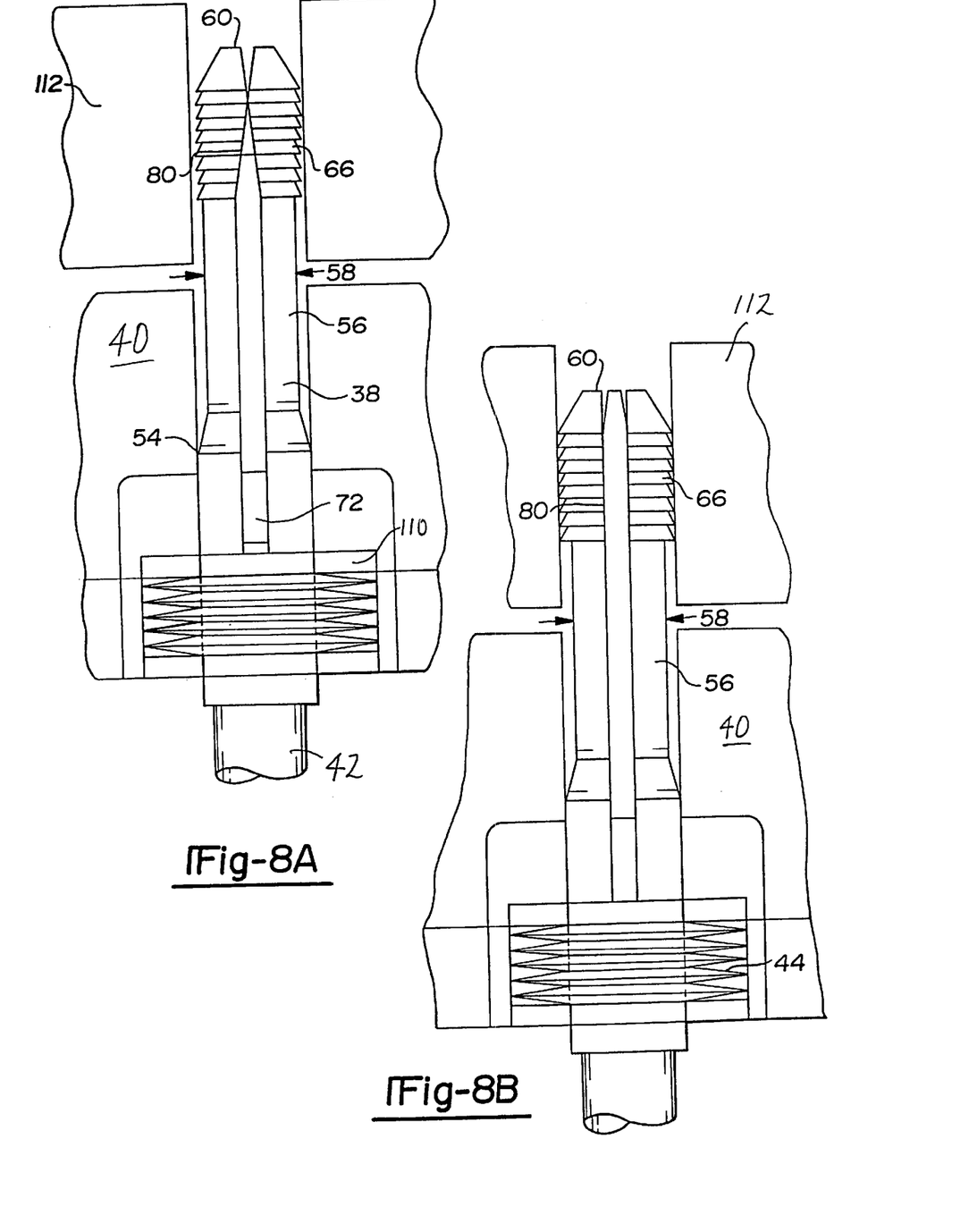
FIG. 8A is an operational view of a workholder according to the present invention.
FIG. 8B is an operational view of a workholder according to the present invention.
Figures 8C, 9:
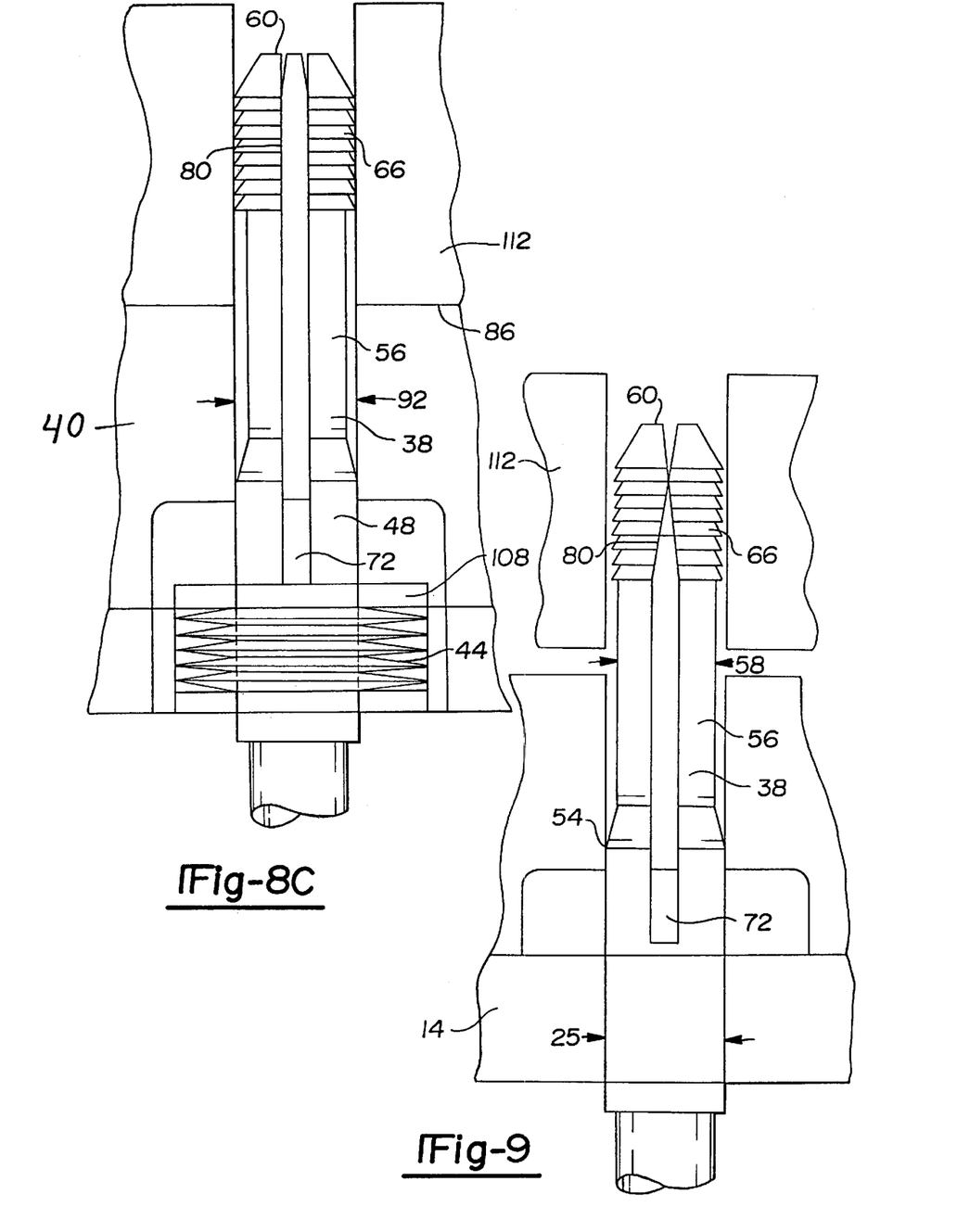
FIG. 8C is an operational view of a workholder according to the present invention.
FIG. 9 is a operational view of a second embodiment of a workholder according to the present invention.

Referring now to FIGS. 8A, 8B, and 8C, the operation of the present invention will be described. In FIG. 8A, work piece 112 is shown positioned around second portion 56 of cylindrical expandable arbor 38. In operation, hydraulic cylinder 42 draws cylindrical expandable arbor 38 downward, thereby causing wing 72 to contact spacer 110. As shown in FIG. 8B, this contact begins compressing spring element 44 which exerts a force opposite to that of hydraulic cylinder 42, thereby causing wedge 46 to move upward toward tip 60 and expand second portion 56. This expansion drives serrated edges 66 into work piece 112. This expansion results in clamping of work piece 112.

It is noted that in the clamped position, first portion 48 and transition point 54 are no longer adjacent to inner diameter 92 of passage 88. Instead, the smaller diameter in the second portion 56 is proximate inner diameter 92. Because of this smaller diameter, cylindrical region 82 is no longer providing support to cylindrical expandable arbor 38. This allows cylindrical expandable arbor 38 to flex and accommodate for any variations in the location of bores in the work piece 112.

Referring now to FIG. 8C, continued retraction of cylindrical expandable arbor 38 by hydraulic cylinder 42 draws work piece 112 against locating surface 86 of elevated support 40. It is noted that the spring constant of spring element 44 changes the amount of clamping pressure exerted on the walls of work piece 112 before work piece 112 is brought against locating surface 86. As such, if one desires a large amount of clamping force on the walls of work piece 112, one would use a spring element 44 with a large spring constant. A large amount of force required to compress spring element 44 would cause a large expansion force of cylindrical expandable arbor 38 before the force would equalize and spring element 44 would be compressed. This large spring force could be any force which ensures that the bore is clamped before it is drawn against locating surface 86. If sufficient clamping force is not obtained before the work piece is drawn against locating surface 86, then the insufficient force could cause cylindrical expandable arbor 38 to broach the bore. If too much force is applied, then the internal bore could be permanently marked. The proper forces can be obtained without undue experimentation and depends on the material which the work piece is constructed from.

Referring now to FIG. 9, a second embodiment of the present invention is shown and described. Here, spacer 108 and 110 and spring element 44 are replaced by a smaller diameter bore 25 in support platform 14. When hydraulic cylinder 42 draws cylindrical expandable arbor 38 downward, wing 72 intersects support platform 14 instead of spacer 108 of the first embodiment. As such, the support platform 14, itself, provides the required opposite force on wing 72 for clamping action. Although this embodiment does not provide the clamping force distribution as the springs in the first embodiment, it does result in reduced construction costs.

Figure 10:
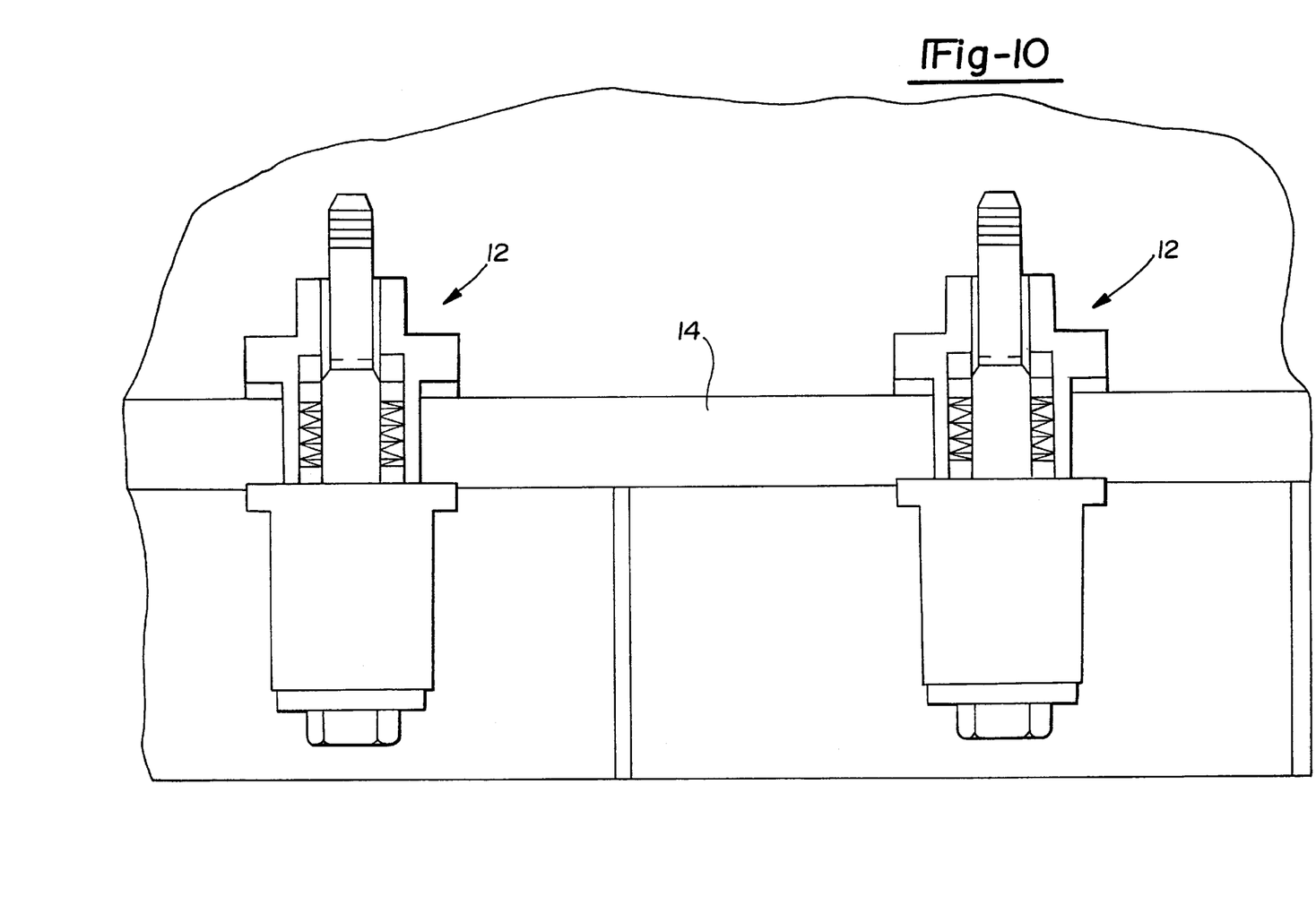
FIG. 10 is a cross-sectional view of a workholder according to a third embodiment of the present invention.

Referring now to FIG. 10, a third embodiment of the present invention is shown and described. Here, two separate clamping devices 12 are mounted to support platform 14. Each clamping device 12 operates as disclosed in the first embodiment above. Each clamping device is positioned to clamp a different bore on one work piece. Because of the absence of support on cylindrical expandable arbor 38 by cylindrical region 82, as discussed in the first embodiment, each cylindrical expandable arbor 38 is able to laterally flex. As a result, a work piece having inaccurate, rough, bores can be clamped without the requirement that each bore be an accurate distance away from the respective bore.

Figure 11:
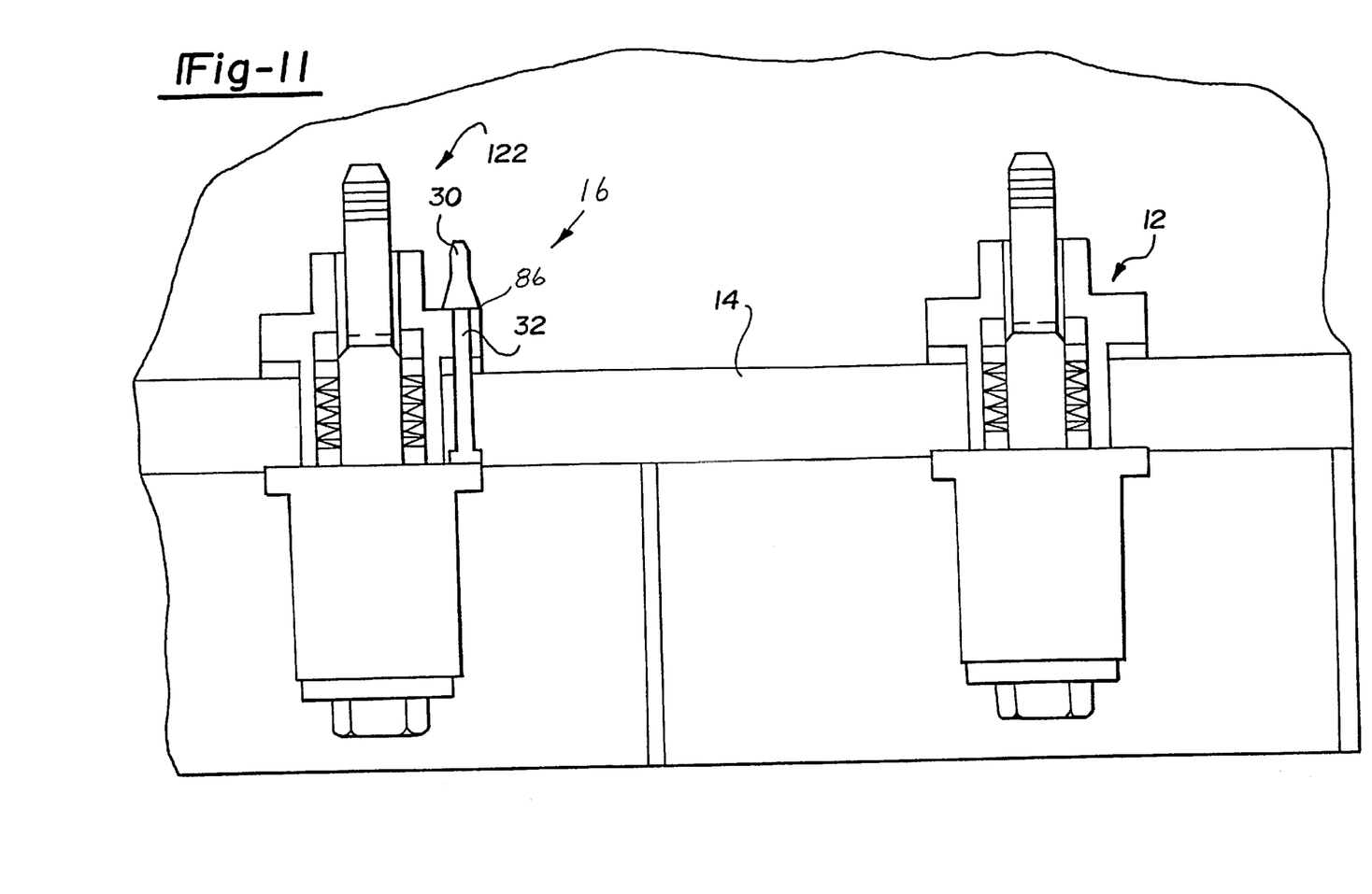
FIG. 11 is a plan view of a work holder according to a fourth embodiment of the present invention.

In FIG. 11, a fourth embodiment is shown having two clamping devices 12 and 122. A locator assembly 16 is mounted to locating surface 86 of clamping device 122. Locator assembly 16 is attached to locating surface 86 and support platform 14 by bolt 32. Here, locator assembly 16 acts to slide into a bore and accurately position a work piece which is being machined. Thus, in operation, bores contained in a work piece are slid over a respective cylindrical expandable arbor 38 of clamping device 12 and 122 as well as locator assembly 16. The locator assembly 16 serves to accurately position the work piece while the clamping devices 12 and 122 serve to secure the work piece.

Figure 12:
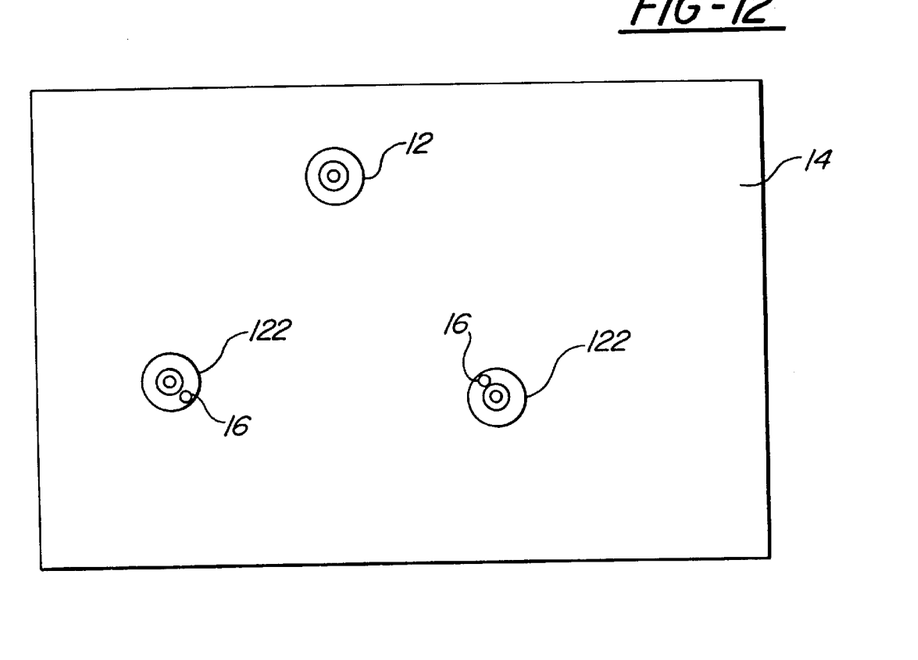
FIG. 12 is a plan view of a work holder according to a fifth embodiment of the present invention.

In FIG. 12, a fifth embodiment of the present invention is shown having a clamping device 12 and clamping devices 122 (which have locator assemblies 16. Unlike the locator in the fourth embodiment, the plurality of locators 16 in the fifth embodiment restrain the work piece from moving in both translational (x and y) as well as rotational about any one locator assembly 16. Also, clamping devices 122 and 12 are shown positioned in a non-linear relationship and, preferably, in a triangular configuration. As such, a maximum amount of stability from rotational and lateral movement is provided to a work piece.

Figure 13:
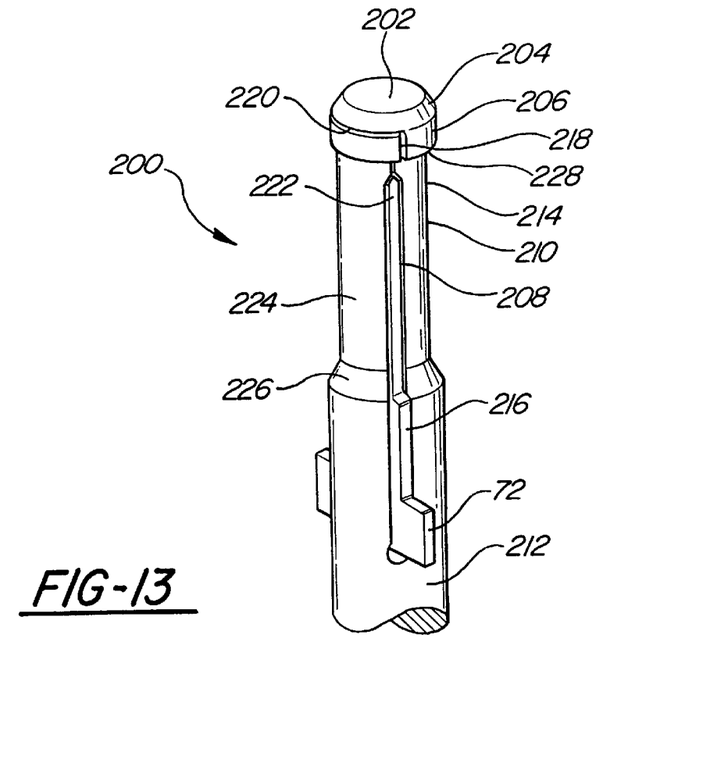
FIG. 13 is a perspective view of an alternative arbor design.

FIG. 13 illustrates an alternative arbor 200 that is an improvement to the arbor 38 shown in FIG. 2. Arbor 200 is designed to prevent metal chips that are created from the machining operation from getting into the slot or engaging the periphery of the arbor. This is accomplished by providing a flat top 202 and an adjoining chamfer 204 extending downwardly into a vertical edge 206 of the upper end of the arbor 200. A vertical slot 208 is cut through the center of the body 210 of the arbor and extends from a first end 212 to the distal end 214 of the arbor. The slot 208 is configured to receive a wedge 216 which extends longitudinally a substantial portion of the arbor. Adjacent the slot 208 is a vertical slit 218 located in the vertical edge 206 which blends into a horizontal slit 220. This configuration is preferably wire cut into the arbor and allows for outward expansion of the arbor when the wedge 216 is moved upwardly. The location of the horizontal slit 220 allows flexible expansion of the arbor, while minimizing metal chips from entering into the slot 208 or from entering into the bore of the work piece that is being machined.

The wedge 216 is similar in design to the wedge 46 disclosed in FIG. 4A, however the tip 222 is more blunt than the tip shown in FIG. 2. By modifying the tip, the rate at which the arbor 200 expands can be controlled. A narrowed section 224 extends between chamfer 226 and lower edge 228. The lower edge 228 engages the upper surface of the work piece for clamping it to the support 40.

Figure 14:
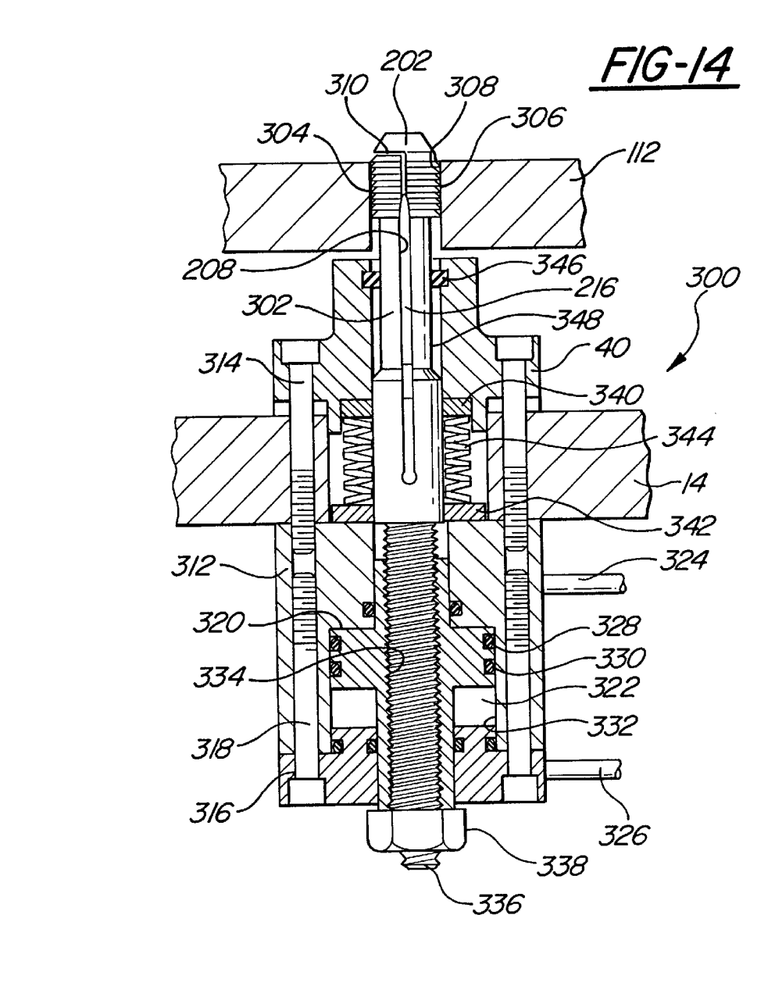
FIG. 14 is a cross-sectional view of a clamping device according to a sixth embodiment of the present invention with an arbor having a capped end with serrations for gripping a part.

With reference to FIG. 14, an improved clamping device 300 is disclosed. Where possible, like reference numerals will be used. The clamping device 300 is similar to the clamping devices 12 and 122, however, the arbor 302 has been modified to take on a variation of the arbor illustrated in FIGS. 13 and 5. The arbor 302 has a flat top 202 with serrations 304 extending down a vertical edge 306 so as to create a gripping surface for engaging bore 308 of work piece 112. An inner channel 310 extends from the vertical edge 306 inward to the center line of the arbor and then vertical to where it meets slot 208. The same wedge 216 is used in arbors 200 and 302 for expanding the arbor and engaging the work piece 112. The wedges, arbor and other components of the clamping device are preferably made of steel.

The clamping device 300 further has an elevated support pad 40 for clamping the work piece 112 against, a fixture base 14, a hydraulic cylinder block 312 connected by bolts 314 to the support pad 40 and the fixture base 14, and an end cap 316. A plurality of bolts 318 extend vertically through the end cap 316 and are connected to the hydraulic cylinder block 312. A floating piston 320 moves within cavity 322 which is in turn defined by internal walls of the hydraulic cylinder block 312 and the end cap 316. The double acting piston 320 is hydraulically actuated and a first hydraulic pressure line 324 provides inlet pressure for a clamp mode of operation. A second hydraulic high pressure line 326 provides hydraulic fluid to cavity 322 during the unclamping mode of operation. The piston 320 includes grooves 328 for receiving seals 330 for creating a tight connection between the piston 320 and inner wall 332 of the cavity 322. The piston 320 further includes an internally threaded bore 334 extending the entire longitudinal length of the piston and is operable to receive screw 336 that is concentric with and is secured to the lower end of arbor 302. A nut 338 is threaded to the lower end of the screw 336 and provides for axial adjustment of the arbor.

The clamping device 300 further includes spacers 340 and 342 located at distal ends of the spring 344. The springs 344 provide for axial dampening of the arbor 302 as it is drawn downward for engagement with the work piece 112. A seal 346 is positioned within the support pad 340 and engages the outer diameter 348 of the arbor 302 and prevents metal shavings from further working down into the clamping device 300.

Figure 15:
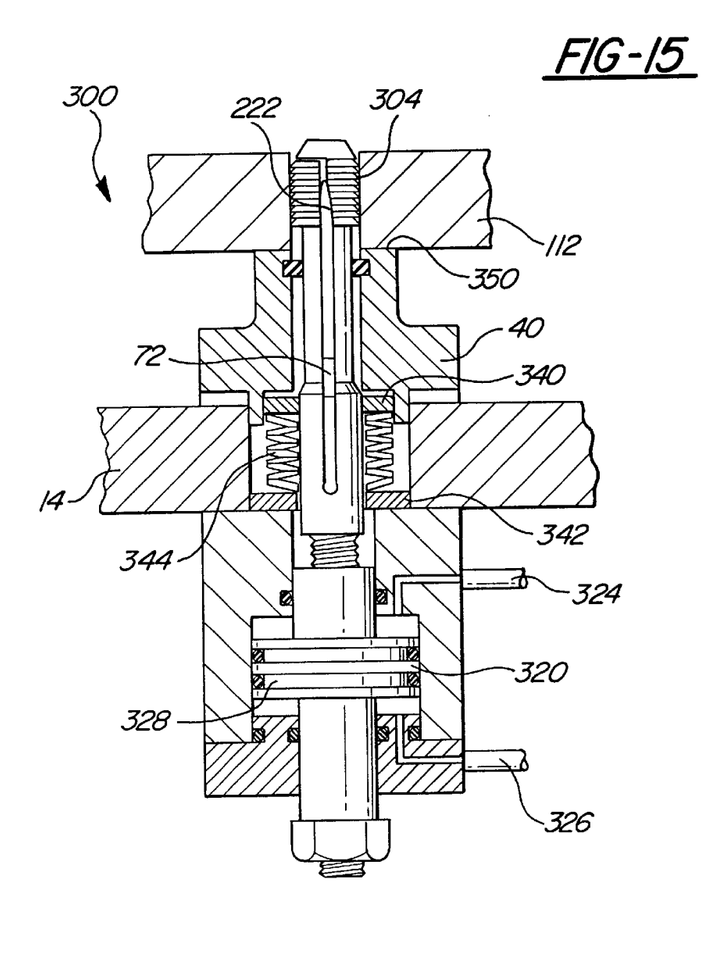
FIG. 15 is a cross-sectional view of a clamping device according to the present invention with the serrations engaging the work piece.

FIG. 14 illustrates the clamping device in the unclamped position where the work piece 112 is not yet located to a machining position against the support pad 40. FIG. 15 illustrates the work piece 112 drawn into position against the upper surface 350 of the support pad 40. This is accomplished by activating hydraulic pressure line 324 which in turn causes piston 320 to move downward. As the piston 320 moves downward, wings 72 react against spacer 340 causing a biasing force against springs 344 which in turn react against spacer 342. It will be appreciated that the springs 344 could be removed thus eliminating the dampening effect and causing a more abrupt reaction and outward expansion of the serrations 304 against the bore of the work piece 112. That particular aspect is illustrated in the FIG. 16 alternative embodiment. As the piston 320 continues to move downward, the tip 222 continues to engage the sloped inner channel 352 of the arbor causing outward expansion and the serrations 304 to engage the bore 308, which in turn secures the work piece 112 in position to allow the machine operation to begin. The cap 202 is appropriately located so as to prevent metal shavings to enter into the slot 208.

Figure 16:
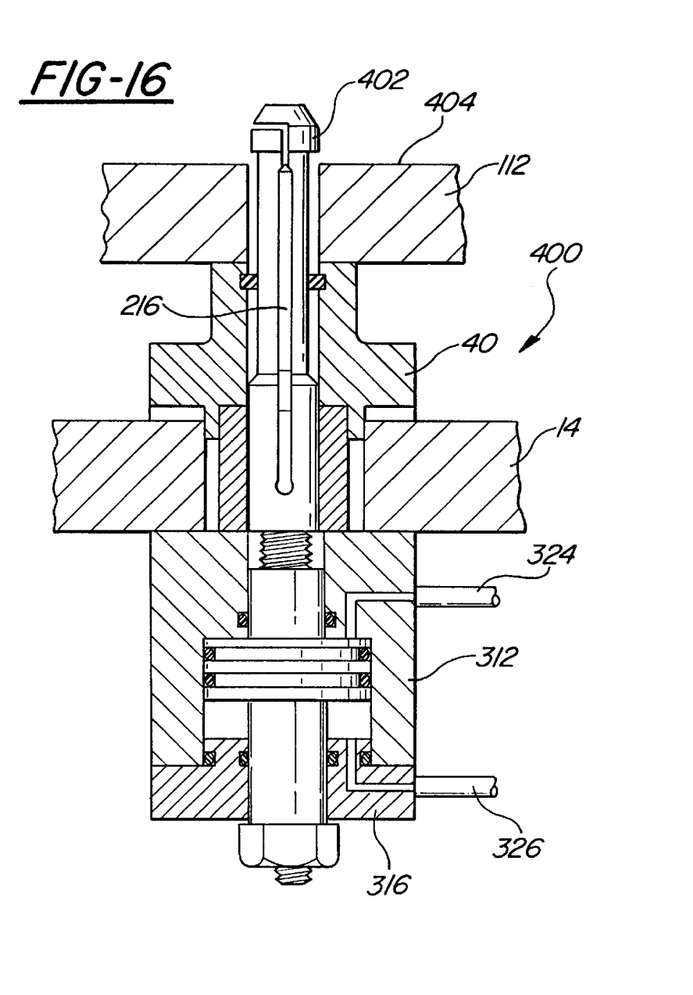
FIG. 16 is a cross-sectional view of a clamping device according to a seventh form of the present invention showing the arbor contracted.

FIG. 16 illustrates a seventh form of the present invention that utilizes an edge-gripping arbor having a cap without any serrations. It will be appreciated that a combination of the FIGS. 14 and 16 embodiments could be used. Clamping device 400 differs from the clamping device 300 illustrated in FIG. 14, in that the tip of the arbor has an outwardly extending horizontal portion, or collar 402 that is operable to engage the upper surface 404 of the work piece 112. The free floating hydraulic clamping device with the edge gripping arbor is operable to provide significant clamping force to secure the work piece 112 against the support pad 40. This design eliminates any broaching problems that could occur with serrated type designs if excessive force were to be exerted downward by the arbor during the clamping procedure.

FIG. 16 illustrates the clamping device 400 in the unclamped position where the wedge 216 is in the retracted position thus allowing the arbor to close inwardly in the horizontal cross-sectional view.

Figure 17:
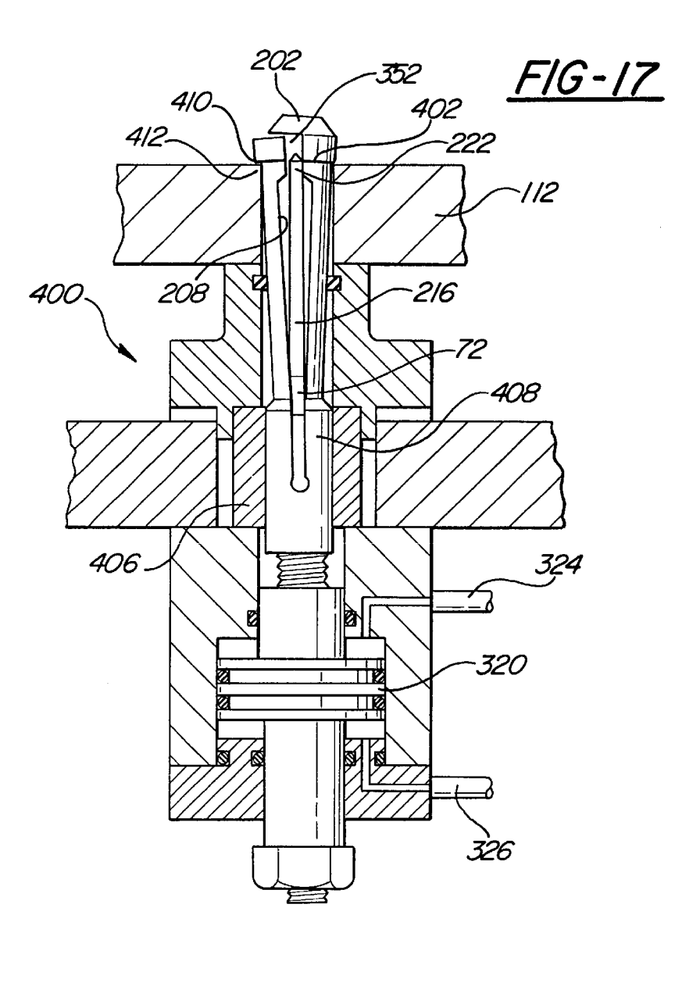
FIG. 17 is a cross-sectional view of a clamping device according to the present invention showing the arbor expanded and the work piece secured.

With reference to FIG. 17, the clamping device 400 is shown with the work piece 112 secured in position. This is accomplished by a fluid, for example, hydraulic fluid, passing through hydraulic pressure line 324 causing the piston 320 to move downward. A spacer 406 is used instead of the previously discussed washers 344 to create a faster clamping reaction. The arbor 408 is constructed similar to the arbor 302 except that there are no serrations. Instead, the cap 202 has a split edge gripping member 410 that is expandable to a predetermined position. As the arbor 408 progresses downward during pressurization of the hydraulic line 324, the bottom of wing 72 of the wedge 216 bottoms out on the top surface of spacer 406. This causes tip 222 of the wedge to protrude up into the inner channel 352 causing outward expansion of the edge gripping member 410. Once the horizontal edge 402 passes over and engages corner 412 of the work piece 112, the arbor 408 can now be secured in place by the next step. This is accomplished by drawing the arbor 408 down causing the gripping member 410 to bear down and lock the work piece in place. The work piece 112 is now firmly secured to the support pad 40 allowing the work piece to be machined. In the locked position as illustrated in FIG. 17, a seal is created between the edge gripping member 410 and the corners 412 of the work piece, which prevent metal particles from working their way down into the inner working components of the clamping device 400.

Once the work piece 112 is machined, hydraulic line 326 is pressurized causing piston 320 to move upwardly thus allowing wedge 216 to retract within a slot 208 which, in turn, allows the split edge gripping member 410 to close and disengage from the work piece 112. The work piece can now be lifted off of the clamping device 400 wherein the method of machining can be repeated.

It will be appreciated that other variations of the free floating hydraulic clamping device utilizing an edge gripping arbor can be utilized.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A workholder for securing a work piece comprising:
   a platform;
   a clamping device assembly mounted to said platform, the clamping device assembly having an expandable arbor with an internal slot longitudinally extending through a center of the arbor with an edge gripping member located at a distal end, the edge gripping member having a cap portion and a shoulder portion the shoulder portion adapted to engage a top surface of the work piece;
   a wedge located within the slot of the arbor;
   an actuating device for moving the arbor; and
   means for adjusting a distance of the expandable arbor and wedge from the actuating device while the clamping device assembly is in an unclamped state.

2. The workholder as claimed in claim 1, wherein the cap portion of the arbor has a plurality of serrations positioned to engage an inner bore of the work piece.

3. The workholder as claimed in claim 1, wherein the edge-gripping members includes a lower edge disposed about a perimeter of the arbor.

4. The workholder as claimed in claim 1, further comprising a work piece support pad disposed between the work piece and the platform, the support pad having a bore operable to receive the arbor.

5. The workholder as claimed in claim 1, wherein the actuating device includes a fluid actuated cylinder that is connected to a lower end of the arbor.

6. The workholder as claimed in claim 1, further comprising a seal disposed around an outer diameter of the arbor.

7. The workholder as claimed in claim 1, wherein the actuating device includes ports for delivering fluid to a piston that is connected to the arbor.

8. A workholder for securing a work piece during a machining operation comprising:
   an actuating device;
   an arbor having a lower end and an upper end where the lower end is connected to the actuating device, the upper end having a slot extending axially along the arbor with a tapered profile, a plurality of spaced apart serrations circumscribing a perimeter near the upper end,. the upper end having a traverse slit and a cover; and
   a support platform for mounting the actuating device thereto.

9. The workholder as claimed in claim 8, wherein the arbor is free floating and expandable.

10. The workholder as claimed in claim 8, further comprising a work piece support pad positioned between the work piece and the support platform.

11. The workholder as claimed in claim 8, further comprising a wedge having a profile to match the shape of the slot.

12. The workholder as claimed in claim 8, wherein the actuating device is hydraulically actuated and is double actuated.

13. The workholder as claimed in claim 8, further comprising:
   a wedge positioned within said slot, said wedge having a pair of wings extending from opposing sides of said wedge and said slot, said wings extending outwardly from said expandable arbor and over the spring element; and
   a spring element positioned between the wedge and the actuating device.

14. A workholder for securing a work piece during a machining operation comprising:

a support platform;

a clamping device mounted to said support platform, said clamping device having a cylindrical expandable arbor extending upward from said support platform for positioning through a bore of the work piece and engaging an outer edge of the bore of the work piece, the arbor having a cap portion located at one end adapted to cover the bore, the arbor further having a longitudinally extending slot;

a wedge positioned within the slot, the wedge having a tapered end portion that engages the slot so as to cause outward movement of the arbor; and means for adjusting a distance of the expandable arbor and wedge from the actuating device while the clamping device assembly is in an unclamped state.

15. A method of securing a work piece during a machine operation comprising the steps of:

providing a work piece having an internal bore and an underside;

providing a clamping device, the clamping device having an expandable arbor with a tip located on one end thereof, the tip having a plurality of spaced apart serrations circumscribing a perimeter near an upper end, said upper end having a traverse slit and a cover;

positioning the arbor through the bore from the underside of the work piece;

expanding the tip of the arbor causing the tip to engage the bore of the work piece; and moving the tip of the arbor down and securing the work piece in place.

16. The method as claimed in claim 15, wherein the step of expanding the tip includes gripping an outer edge of the bore of the work piece.

17. The method as claimed in claim 15, further comprising the step of penetrating serrations that are located on the tip of the arbor into the bore, and forcing the work piece in a downward direction so as to lock the work piece into a machining position.

18. The method as claimed in claim 15, wherein the moving step is accomplished by a hydraulic actuator.

19. The method as claimed in claim 15 further comprising the step of securing the work piece against a work support member and machining the work piece.

* * * * *